(12) United States Patent
Otsuka et al.

(10) Patent No.: US 9,739,642 B2
(45) Date of Patent: Aug. 22, 2017

(54) ENCODER SCALE AND MANUFACTURING AND ATTACHING METHOD THEREOF

(71) Applicant: MITUTOYO CORPORATION, Kawasaki-shi, Kanagawa (JP)

(72) Inventors: Takanori Otsuka, Utsunomiya (JP); Taisuke Wakasa, Utsunomiya (JP); Kouichi Yoshihara, Nikko (JP); Ryo Morita, Utsunomiya (JP); Kazuhiko Kodama, Utsunomiya (JP)

(73) Assignee: MITUTOYO CORPORATION, Kawasaki-shi (JP)

( * ) Notice: Subject to any disclaimer, the term of this patent is extended or adjusted under 35 U.S.C. 154(b) by 0 days.

(21) Appl. No.: 15/134,592

(22) Filed: Apr. 21, 2016

(65) Prior Publication Data

US 2016/0313144 A1    Oct. 27, 2016

(30) Foreign Application Priority Data

Apr. 24, 2015 (JP) ................. 2015-089810
May 14, 2015 (JP) ................. 2015-099392

(51) Int. Cl.
*G01B 7/14* (2006.01)
*G01D 5/20* (2006.01)

(52) U.S. Cl.
CPC ................. *G01D 5/2053* (2013.01)

(58) Field of Classification Search
CPC ..................................... G01B 7/14

USPC .................................. 324/207.24
See application file for complete search history.

(56) References Cited

U.S. PATENT DOCUMENTS 5,635,833 A * 6/1997 Onodera et al. ......... 324/207.22
6,002,250 A * 12/1999 Masreliez et al. ....... 324/207.16
2001/0005139 A1* 6/2001 Adachi et al. ................ 324/671
2009/0033946 A1* 2/2009 Kon et al. .................... 356/499

FOREIGN PATENT DOCUMENTS

JP    2004-333417    11/2004

OTHER PUBLICATIONS

Partial Translation of JP 2004-333417, Nov. 2004.*

* cited by examiner

*Primary Examiner* — Bot Ledynh
(74) *Attorney, Agent, or Firm* — Rankin, Hill & Clark LLP

(57) ABSTRACT

An encoder scale, displaced relative to a detector head, includes: an insulating substrate; a conductive adhesive layer that is formed on the insulating substrate; and conductive pattern layers that are formed on the adhesive layer in a shape enabling the detector head to detect a position, wherein: the adhesive layer electrically connects all the pattern layers and includes an out-of-detection-range pattern that extends outward from a position detection range of the detector head; and the out-of-detection-range pattern is grounded via a conductive member.

8 Claims, 8 Drawing Sheets

ENCODER SCALE AND MANUFACTURING AND ATTACHING METHOD THEREOF

CROSS-REFERENCE TO RELATED APPLICATION(S)

This application is based upon and claims the benefit of priority from Japanese Patent Application No. 2015-089810, filed on Apr. 24, 2015, and Japanese Patent Application No. 2015-099392, filed on May 14, 2015, the entire contents of which are incorporated herein by reference.

BACKGROUND

1. Field of the Invention

The present invention relates to an encoder scale and a manufacturing and attaching method thereof, and more particularly, to an encoder scale that can stably resolve a phenomenon in which the encoder scale is charged with static electricity and a manufacturing and attaching method thereof.

2. Description of the Related Art

In the related art, as described in JP-A-2004-333417, for example, an electromagnetic induction type (magnetic) linear encoder has been used. In the electromagnetic induction type linear encoder, scale coils (conductive pattern layers) are formed in a measurement direction of the encoder scale. Particularly, a ground pattern is formed outside the scale coils to ground the ground pattern to a scale base. Accordingly, static electricity generated in the encoder scale is let to go to the scale base.

However, the electromagnetic induction type linear encoder described in JP-A-2004-333417 basically serves as an effective countermeasure against static electricity for a part of the encoder scale in which the ground pattern (which may be a conductive pattern) is formed. That is, such a ground pattern may not be sufficiently effective for a part other than the part in which the ground pattern is formed.

For example, when the scale coil itself is charged with static electricity, operation failure, malfunction, or the like of the electromagnetic linear encoder may be caused in discharging the static electricity accumulated in the scale coils.

SUMMARY

The present invention is made to solve the above-mentioned problem and an object thereof is to provide an encoder scale that can stably resolve a phenomenon in which the encoder scale is charged with static electricity and a manufacturing and attaching method thereof.

According to a first aspect of the invention, there is provided an encoder scale, displaced relative to a detector head, including: an insulating substrate; a conductive adhesive layer that is formed on the insulating substrate; and conductive pattern layers that are formed on the adhesive layer in a shape enabling the detector head to detect a position, wherein: the adhesive layer electrically connects all the pattern layers and includes an out-of-detection-range pattern that extends outward from a position detection range of the detector head; and the out-of-detection-range pattern is grounded via a conductive member.

According to a second aspect of the invention, the encoder scale, according to the first aspect, may further include an insulating protective layer covering the adhesive layer and all the pattern layers in the position detection range.

According to a third aspect of the invention, the encoder scale according to the second aspect, the conductive member may cover the entire out-of-detection-range pattern on which the insulating protective layer is not formed.

According to a fourth aspect of the invention, in the encoder scale according to any one of the first aspect to the third aspect, the conductive member may include a conductive thin film and a resin adhesive film including a conductive filler on the bottom surface thereof, and the thin film may be electrically connected to the out-of-detection-range pattern by bringing the out-of-detection-range pattern into contact with the conductive filler.

According to a fifth aspect of the invention, in the encoder scale according to any one of the first aspect to the fourth aspect, the conductive member may include a metallic holding member that is formed in a shape which is elastically deformed to hold the insulating substrate, and when the conductive member includes a conductive thin film, the holding member may clamp the thin film and the insulating substrate together to press the thin film against the out-of-detection-range pattern.

According to a sixth aspect of the invention, in the encoder scale according to any one of the first aspect to the fourth aspect, the conductive member may include a conductive elastic member, and when the conductive member includes a conductive thin film, the elastic member may be disposed to press the thin film against the out-of-detection-range pattern.

According to a seventh aspect of the invention, in the encoder scale according to any one of the first aspect to the sixth aspect, the encoder scale may be grounded at only one position.

According to a eighth aspect of the invention, there is provided a method of manufacturing and attaching an encoder scale that is displaced relative to a detector head, the method including: forming a conductive adhesive layer on an insulating substrate; forming pattern layers having a shape, in which the pattern layers are electrically connected to each other by the adhesive layer and which enables the detector head to detect a position, on the adhesive layer; and grounding an out-of-detection-range pattern of the adhesive layer extending outward from a position detection range of the detector head via a conductive member.

According to the present invention, it is possible to stably resolve a phenomenon in which the encoder scale is charged with static electricity.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, an example of a first embodiment of the present invention will be described in detail with reference to the accompanying drawings.

First, the entire constitution of an encoder 100 will be described.

Figure 1:
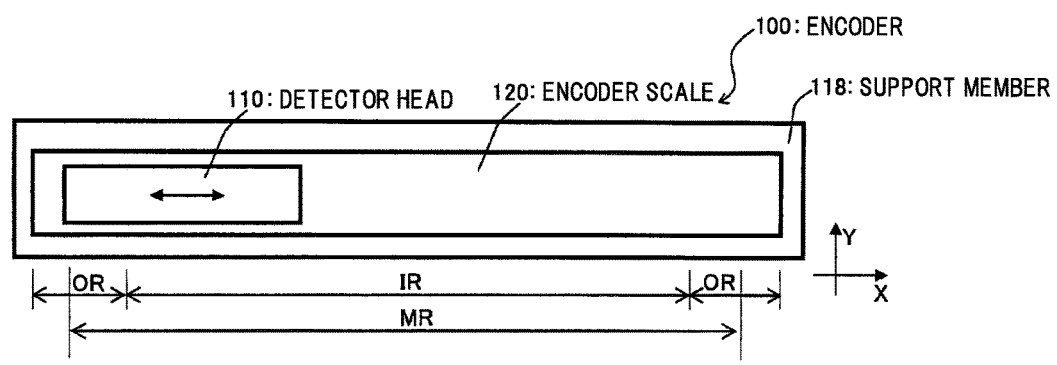
FIG. 1 is a schematic diagram illustrating an example of a linear encoder according to a first embodiment of the present invention.

The encoder 100 is an assembly type electromagnetic induction linear encoder and includes a detector head 110 and an encoder scale 120 that is displaced in a measurement direction X relative to the detector head 110 as illustrated in FIG. 1. The detector head 110 is supported by the encoder scale 120 and the encoder scale 120 is supported by a support member 118. The encoder scale 120 and the detector head 110 are attached to a fixed part and a mobile part moving relative to the fixed part in a device (a measuring device or a machining device) which is not illustrated, respectively. The support member 118 has conductivity and is connected to a reference potential via the fixed part of the device, that is, is grounded. The encoder 100 may be of an incremental type or of an absolute type.

Figure 2:
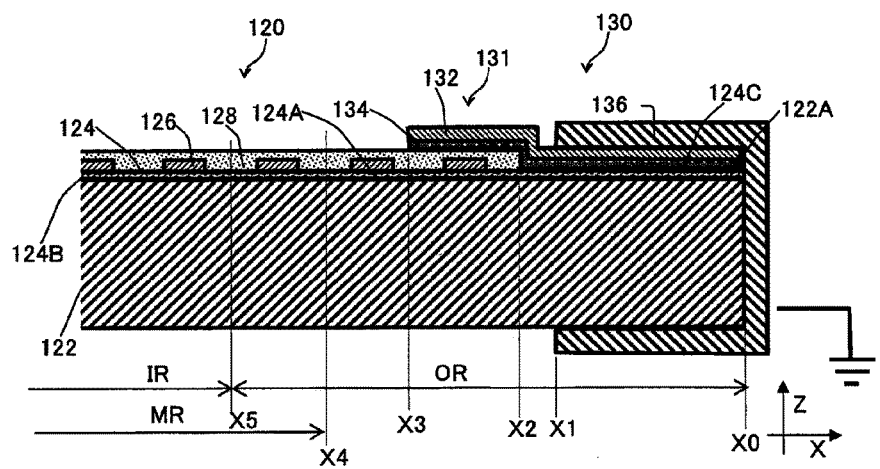
FIG. 2 is a schematic cross-sectional view of an encoder scale of the linear encoder illustrated in FIG. 1.
Figure 3:
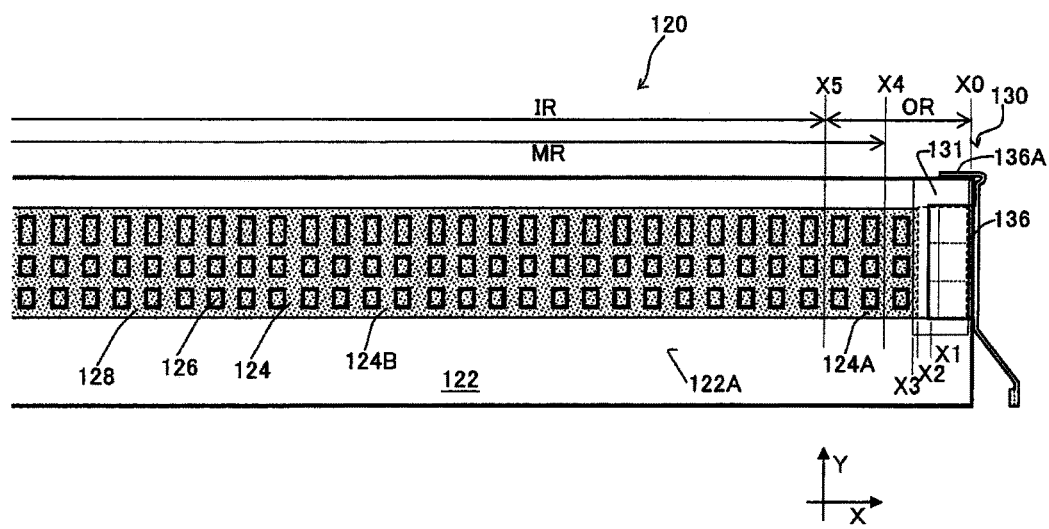
FIG. 3 is a schematic top view of the encoder scale illustrated in FIG. 2.

In FIG. 1, reference sign IR denotes a range (position detection range) in which a position in the encoder scale 120 can be detected by the detector head 110 (In FIGS. 2 and 3, a position X5 indicates an end of the position detection range IR). Reference sign OR denotes a range (out-of-detection range) in which a position in the encoder scale 120 cannot be detected by the detector head 110. Reference sign MR denotes a range (bearing contact range) in which the encoder scale 120 can come in contact with a bearing formed in the detector head 110 (In FIGS. 2 and 3, a position X4 indicates an end of the bearing contact range MR).

The detector head 110 is supported by the encoder scale 120 so as to face each other with plural bearings (or rollers) which are not illustrated (with a facing distance of, for example, 1 mm or less) and to be movable in the measurement direction X. The detector head 110 includes an excitation coil and a detection coil which are not illustrated. The detector head 110 induces an induced current to the pattern layers 126 of the encoder scale 120 from the excitation coil, and detects the induced current using the detection coil. By this constitution, the detector head 110 detects the position of the detector head 110 relative to the encoder scale 120.

The encoder scale 120 includes a glass substrate 122, an adhesive layer 124, a pattern layer 126, and a protective layer 128 as illustrated in FIGS. 2 and 3.

The glass substrate 122 is an insulating substrate and has a rectangular parallelepiped shape having long sides in the measurement direction X as illustrated in FIGS. 2 and 3. The glass substrate 122 is formed of general glass, but may be a glass substrate (including a glass ceramics substrate) having a low thermal expansion coefficient. The glass substrate 122 has a thermal expansion coefficient lower than that of metal. The glass substrate 122 also has low hygroscopicity. Accordingly, it is possible to prevent detection accuracy from much varying with a variation in temperature or humidity by employing the glass substrate 122.

As illustrated in FIGS. 2 and 3, the adhesive layer 124 is formed on a surface 122A of the detector head side. As illustrated in FIG. 3, the adhesive layer 124 is formed in only a part in the Y direction and does not cover the entire detector-head-side surface 122A (the adhesive layer is not limited to this constitution but may be a solid pattern covering the entire detector-head-side surface). However, the adhesive layer 124 covers the entire glass substrate 122 with a detection-range pattern 124B present in the position detection range IR and an out-of-detection-range pattern 124A extending outward from the position detection range IR and being present in the out-of-detection range OR in the measurement direction X (that is, the adhesive layer 124 includes the out-of-detection-range pattern 124A). The adhesive layer 124 has a constant thickness (for example, 50 nm to 100 nm) and electrically connects all the pattern layers 126. The adhesive layer 124 is a conductive metal film of Cr, Ti, Mo, Ni, or the like (the adhesive layer is not limited to this constitution but may be formed of a conductive inorganic compound such as ITO). The adhesive layer 124 has a good adhesiveness to the glass substrate 122 and can be formed using a vacuum film formation method such as deposition or sputtering.

As illustrated in FIGS. 2 and 3, the pattern layers 126 are formed on the top surface 124c of the adhesive layer 124 to be wide over the position X5 of the end of the position detection range IR. The pattern layers 126 are, for example, plural substantially-rectangular coils and are formed in a shape enabling the detector head 110 to detect a position (not limited to the rectangular shape). The pattern layers 126 are formed of a conductive metal film (which may be Au or Ag) of Cu, Ai, or the like and has a thickness of, for example, 200 nm to 500 nm. The pattern layers 126 can be formed, for example, by a thin film (with a thickness of, for example, 10 nm to 50 nm) using a vacuum film formation method such as deposition or sputtering and increasing the thickness thereof using a wet film formation method such as electroplating. A barrier metal layer (which can be formed of Cr, Ti, Mo, Ni, or the like) may be formed between the pattern layers 126 and the adhesive layer 124 so as not to mutually diffuse the materials thereof. By forming the barrier metal layer, it is possible to maintain the constitutions of the layers for a longer period of time.

The thickness of the adhesive layer 124 is set to, for example, 50 nm to 100 nm. The electric resistiviy of the materials thereof greatly diversifies (for example, the electric resistivity ratio of Cu used in the pattern layers 126 to Cr used in the adhesive layer 124 is substantially 1/10). Accordingly, by optimizing the adhesive layer 124 and the pattern layers 126, it is possible to prevent the induced current induced in the pattern layers 126 from affecting the adhesive layer 124.

The protective layer 128 is an insulating film formed of an organic material such as a resin and is formed up to the position X2 so as to cover at least the adhesive layer 124 in the position detection range IR and all the pattern layers 126 as illustrated in FIGS. 2 and 3. The protective layer 128 is not formed on the out-of-detection-range pattern 124A between the position XO and the position X2 in one out-of-detection range OR (In FIG. 1, the protective layer 128 covers the adhesive layer 124 and all the pattern layers 126 in one out-of-detection range OR). Since the surface of the protective layer 128 is flat, it is possible to stably prevent the pattern layers 126 from being missed or the like (not limited to this constitution, but unevenness may be formed on the surface of the protective layer depending on the presence of the pattern layers). The protective layer 128 can be formed by coating of a spin coater, a roll coater, a printer, or the like.

As illustrated in FIG. 3, in the part (a range from the position XO to the position X2) of the out-of-detection-range pattern 124A in which the protective layer 128 is not formed, the out-of-detection-range pattern 124A is electrically connected to a conductive member 130. The conductive member 130 includes an aluminum tape 131 and a ground clip (holding member) 136.

As illustrated in FIG. 2, the aluminum tape 131 includes an aluminum film (conductive thin film) 132 and a resin adhesive film 134 including a conductive filler on the bottom surface thereof. The thickness of the aluminum tape 131 ranges from 50 µm to 100 µm. The aluminum tape 131 is formed from the position XO to the position X3 in the measurement direction X so as to cover the entire out-of-detection-range pattern 124A on which the protective layer 128 is not formed. The aluminum film 132 is electrically connected to the out-of-detection-range pattern 124A by bringing the out-of-detection-range pattern 124A into contact with the conductive filler of the resin adhesive film 134. Carbon black, carbon fiber, graphite, metal powder (Au, Ag, or the like), metal oxide, metal fiber, synthetic resin having a surface coated with metal, glass bead or the like in the form of flake, powder, or fiber can be used as the conductive filler.

Figure 4A:
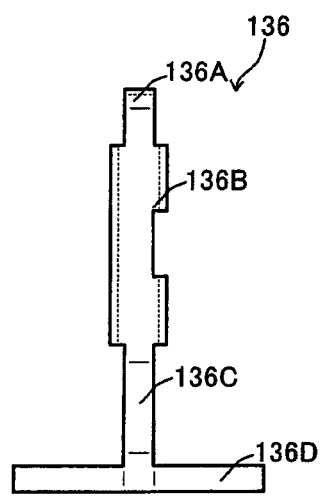
FIGS. 4A to 4C are schematic diagrams of a ground clip which is connected to the encoder scale illustrated in FIG. 2 (where FIG. 4A is a front view, FIG. 4B is a side view, and FIG. 4C is a bottom view)
Figure 4B:
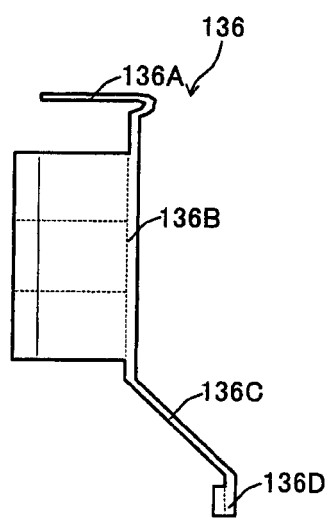
Figure 4C:
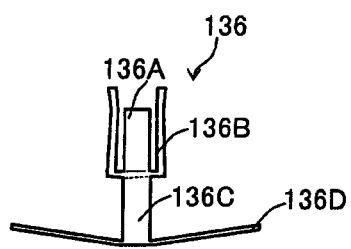

As illustrated in FIGS. 4A to 4C, the ground clip 136 is a metallic member formed in a shape which can be elastically deformed to clamp the glass substrate 122 and is formed as a unified body out of a corrosion-resistant metal plate such stainless steel. As illustrated in FIGS. 4A to 4C, the ground clip 136 includes a locking portion 136A, a holding portion 136B, a leaf spring portion 136C, and a connection portion 136D.

As illustrated in FIG. 3, the locking portion 136A comes in contact with the top surface of the glass substrate 122 when the glass substrate 122 is clamped by the holding portion 136B, and limits upward movement of the glass substrate 122. The holding portion 136B is formed at the lower end of the locking portion 136A.

As illustrated in FIGS. 4A to 4C, the holding portion 136B has a substantially U-shaped cross-section capable of clamping the glass substrate 122 from the detector-head-side surface 122A and the back surface thereof (In the substantially U-shape, two ends are slightly opened and parts just inside the ends get close to each other). The leaf spring portion 136C is disposed to obliquely extend at the lower end of the holding portion 136B.

As illustrated in FIGS. 4A to 4C, the leaf spring portion 136C is a portion serving to press the connection portion 136D formed at the lower end of the leaf spring portion 136C against the support member 118. The connection portion 136D has a leaf spring structure having a substantially A-shaped cross-section and is electrically connected to the support member 118.

As illustrated in FIG. 2, the ground clip 136 clamps the aluminum tape 131 and the glass substrate 122 together so as to press (the aluminum film 132 of) the aluminum tape 131 against the out-of-detection-range pattern 124A. The ground clip 136 is grounded via the support member 118. For example, the grounded clip 136 is disposed only in the out-of-detection range OR at the right end of the encoder scale 120 illustrated in FIG. 1. That is, the encoder scale 120 is grounded only at one position by the ground clip 136.

A flow of manufacturing and attaching the encoder scale 120 will be described below mainly with reference to FIGS. 5A to 5D and FIGS. 6A to 6D.

First, a uniform adhesive layer 124 is formed on the glass substrate 122 using a vacuum film formation method such as deposition or sputtering. For example, Cr is used as the material thereof.

Then, a uniform functional layer 125 serving as the pattern layers 126 is formed on the adhesive layer 124. At this time, the functional layer 125 is formed by forming a thin film using a vacuum film formation method such as deposition or sputtering and increasing the thickness thereof using a wet film formation method such as electroplating. For example, Cu is used as the material thereof.

Here, since a Cr metal film as the adhesive layer 124 is first formed on the glass substrate 122, it is possible to enhance adhesive strength between the glass substrate 122 and the adhesive layer 124. Since different metals are used but the Cu metal film is formed on the Cr metal film using the same vacuum film formation method, it is possible to keep the adhesive strength between the adhesive layer 124 and the Cu metal film high. Since the Cu metal film is plated with the same material Cu using the different film formation method, it is possible to keep the adhesive strength between the Cu metal film and the Cu plating film high. That is, it is possible to enhance the adhesive strength between the glass substrate 122 and the functional layer 125 including the Cu metal film and the Cu plating film. The functional layer is not limited to this constitution, but the functional layer may be formed using thermal spraying or printing or the like.

Figure 5A:
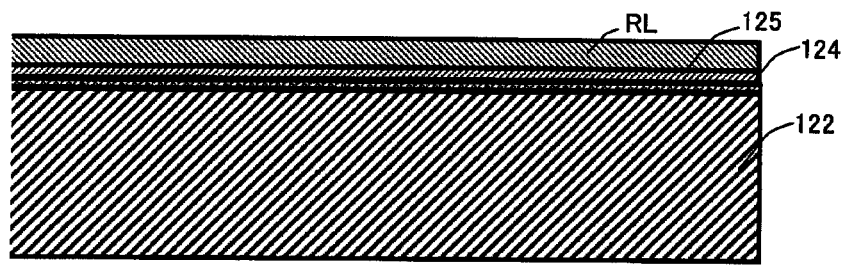
FIGS. 5A to 5D are schematic diagrams illustrating a first half of a flow of manufacturing and attaching the encoder scale illustrated in FIG. 2.

Then, as illustrated in FIG. 5A, a uniform resist layer RL is formed on the functional layer 125 using a spin coater, a roll coater, or the like.

Figure 5B:
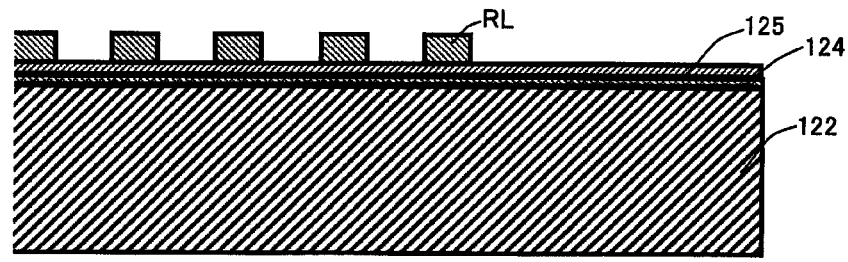

Then, as illustrated in FIG. 5B, the resist layer RL is formed in a mask shape for forming the pattern layers 126 using a lithography method or the like.

Figure 5C:
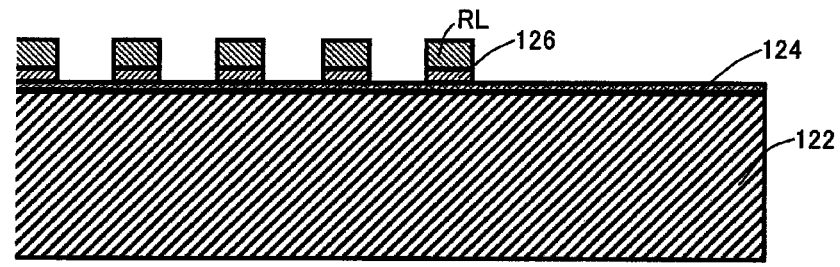

Then, as illustrated in FIG. 5C, the functional layer 125 in an area not masked with the resist layer RL formed in the mask shape is removed using a dry etching method or a wet etching method to form the pattern layers 126. The pattern layers 126 have a shape enabling the detector head 110 to detect a position. At this time, the adhesive layer 124 is not etched but is left with a uniform thickness. Accordingly, all the pattern layers 126 are electrically connected by the adhesive layer 124.

Figure 5D:
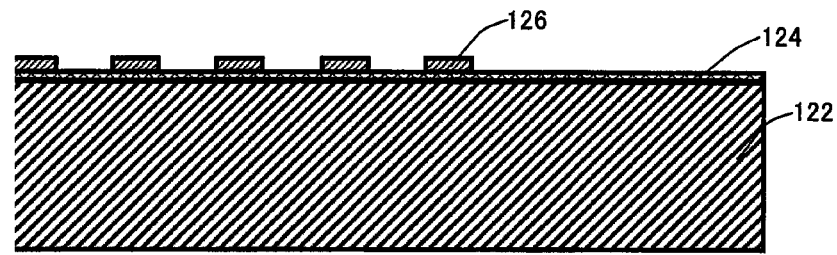

Then, as illustrated in FIG. 5D, the resist layer RL formed in the mask shape is removed.

Figure 6A:
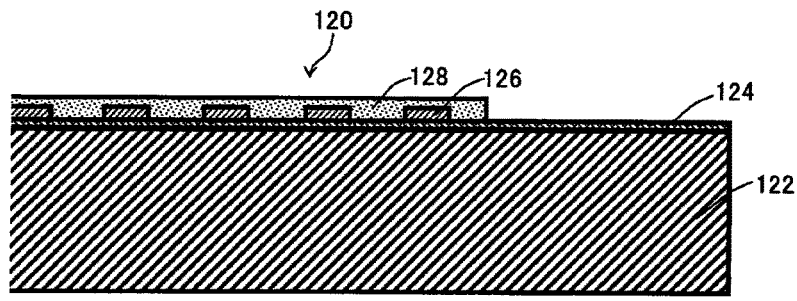
FIGS. 6A to 6D are schematic diagrams illustrating a second half of the flow of manufacturing and attaching the encoder scale illustrated in FIG. 2.

Then, as illustrated in FIG. 6A, the insulating protective layer 128 is formed wide over the position detection range IR of the detector head 110. The protective layer 128 may be formed by excluding a part of the out-of-detection-range pattern 124A in advance and performing application such as printing. Alternatively, the protective layer 128 may be formed on the entire surface of the glass substrate 122 including the part of the out-of-detection-range pattern 124A and the protective layer 128 of the part of the out-of-detection-range pattern 124A may be removed later.

Figure 6B:
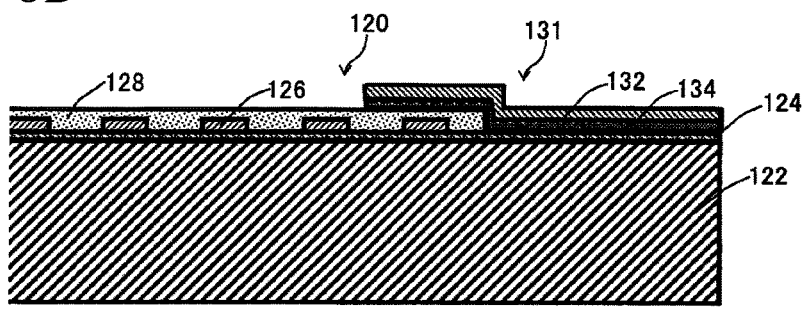

Then, as illustrated in FIG. 6B, the aluminum tape 131 is bonded to cover the entire out-of-detection-range pattern 124A not covered with the protective layer 128 but exposed.

Figure 6C:
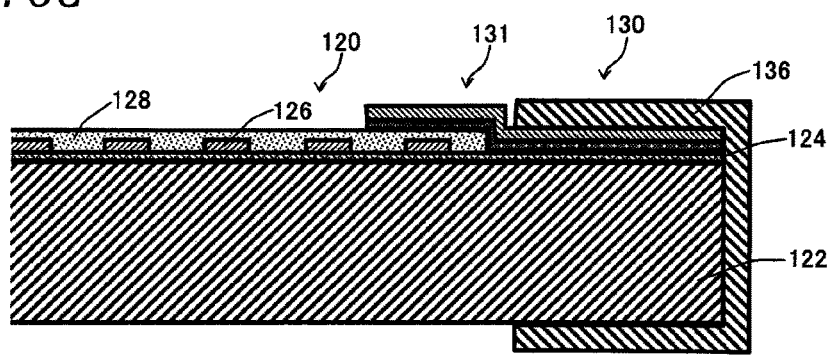

Then, as illustrated in FIG. 6C, the part of the glass substrate 122 bonded to the aluminum tape 131 is clamped with the ground clip 136.

Figure 6D:
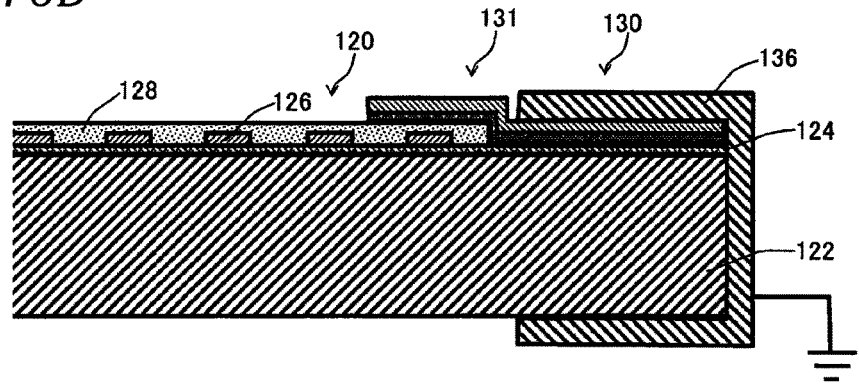

Then, as illustrated in FIG. 6D, the ground clip 136 is connected to the support member 118 for grounding. That is, the out-of-detection-range pattern 124A is grounded via the aluminum tape 131 and the ground clip 136 which are the conductive member 130.

As described above, according to this embodiment, since the adhesive layer 124 is merely a uniform layer, an etching step of making the adhesive layer 124 into the same shape as the pattern layers 126 is not required. In addition, it is necessary to newly form a ground pattern on the encoder scale 120. Accordingly, it is possible to suppress an increase in the number of steps of manufacturing and attaching the encoder scale 120.

In this embodiment, the adhesive layer 124 and the pattern layers 126 are formed on the glass substrate 122. Accordingly, the adhesive layer 124 can be formed with an optimal thickness using an optimal material for maintaining the adhesive strength between the glass substrate 122 and the pattern layers 126. In addition, the pattern layers 126 can be formed with an optimal thickness using an optimal material for enabling the detector head 110 to detect a position. That is, since the adhesive layer 124 and the pattern layers 126 are formed, it is possible to freely optimize the functions for the encoder scale 120. Accordingly, in this embodiment, it is possible to improve adhesiveness of the pattern layers 126 to the glass substrate 122 and to realize the pattern layers 126 optimal for the detection. In this embodiment, since all the pattern layers 126 are supported by the uniform adhesive layer 124, it is possible to prevent a part of the pattern layers 126 from being missed.

In this embodiment, the adhesive layer 124 electrically connects and grounds all the pattern layers 126 regardless of the pattern shapes of the pattern layers 126. Accordingly, for example, even when static electricity is generated due to a contact of the detector head 110 with a bearing, it is possible to let out the static electricity of the pattern layers 126 and to prevent occurrence of discharge or the like between the detector head 110 and the pattern layers.

In this embodiment, the protective layer 128 is formed to cover the adhesive layer 124 and all the pattern layers 126 in the position detection range IR. Accordingly, it is possible to prevent corrosion such as rust of the adhesive layer 124 and the pattern layers 126. That is, it is possible to aging of the encoder scale 120 and to secure high durability and environment resistance. Not limited to this constitution, the protective layer may be formed to cover only a part of the adhesive layer or the pattern layers in the position detection range IR or the protective layer may not be formed.

In this embodiment, the aluminum tape 131 is formed to cover the entire out-of-detection-range pattern 124A on which the protective layer 128 is not formed. Accordingly, it is possible to reduce corrosion of the out-of-detection-range pattern 124A and to realize higher environment resistance. Not limited to this constitution, the aluminum tape may be formed to cover only a part of the out-of-detection-range pattern on which the protective layer is not formed or may not cover the out-of-detection-range pattern in which the protective layer is not formed. The covering may be performed with a conductive adhesive such as conductive silicon or another conductive member instead of the aluminum tape.

In this embodiment, the conductive member 130 includes the aluminum tape 131 including the aluminum film 132 and the resin adhesive film 134 containing the conductive filler on the bottom surface thereof. The aluminum tape 131 includes a passive coating on the surface thereof. Accordingly, it is possible to prevent corrosion of the aluminum film 132 itself. The aluminum film 132 is electrically connected to the out-of-detection-range pattern 124A via the conductive filler of the resin adhesive film 134. The aluminum film 132 itself has high ductility and the resin adhesive film 134 is interposed between the aluminum film 132 and the out-of-detection-range pattern 124A. Accordingly, it is possible to prevent a clearance from being formed between the aluminum film 132 and the out-of-detection-range pattern 124A and being infiltrated with moisture or the like. In addition, the aluminum film 132 and the adhesive layer 124 are not electrically connected directly to each other. Accordingly, it is possible to avoid occurrence of electric corrosion based on the ionization tendency or the like. As a result, it is possible to prevent the out-of-detection-range pattern 124A or the pattern layers 126 from being missed due to the electric corrosion to cause an error in position detection.

Not limited to this constitution, the conductive member may include an aluminum film not including the resin adhesive film in the aluminum tape (a Cu film may be used). Alternatively, a conductive inorganic compound film of ITO or the like may be used instead of the aluminum film. In this case, the film and the out-of-detection-range pattern may be electrically connected with a pressing force of the ground clip. Alternatively, the ground clip may be electrically connected directly to the out-of-detection-range pattern. Alternatively, the ground clip may not be used but the conductive member may include only a coated wire, a mesh wire, or the like. Alternatively, the conductive member may include only a conductive adhesive such as conductive silicon or another conductive member.

In this embodiment, the conductive member 130 includes the ground clip 136. The ground clip 136 clamps the aluminum film 132 and the glass substrate 122 to press the aluminum film 132 against the out-of-detection-range pattern 124A. Accordingly, the electric connection between the out-of-detection-range pattern 124A and the aluminum tape 131 can be further stabilized. In addition, it is possible to easily attachment and detachment of the encoder scale 120 to and from the support member 118 while satisfactorily grounding the encoder scale 120. The ground clip 126 can also be easily replaced. Not limited to this constitution, the ground clip may have a shape other than the shapes illustrated in FIGS. 4A to 4C.

In this embodiment, the encoder scale 120 is grounded at only one position. Accordingly, it is possible to prevent the encoder scale 120 from forming an electrical loop, that is, a constitution like an "antenna." That is, it is possible to prevent electrical noise from being transmitted to the encoder scale 120. No limited to this constitution, the encoder scale may be grounded at plural positions. In this case, it is possible to reduce noise using a filter or the like together.

That is, in this embodiment, it is possible to stably resolve a phenomenon in which the encoder scale 120 is charged with static electricity.

While the present invention is described above in conjunction with the first embodiment, the present invention is not limited to the above-mentioned embodiment. That is, the present invention can be improved and modified in design without departing from the gist of the present invention.

Figure 7:
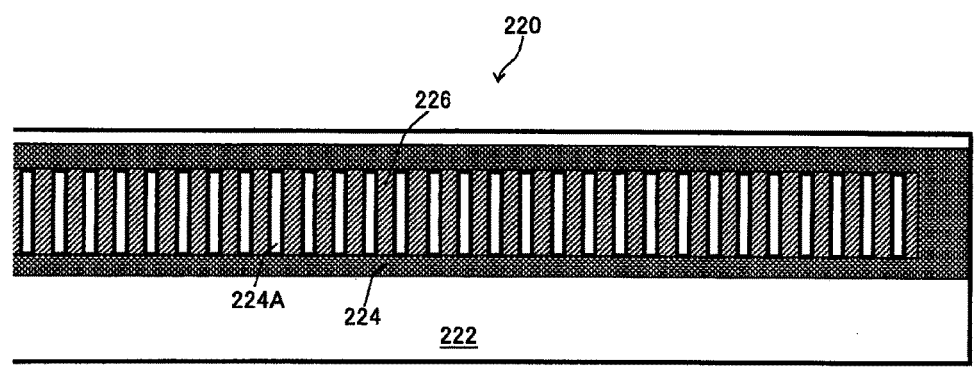
FIG. 7 is a schematic diagram illustrating an example of an encoder scale according to a second embodiment of the present invention.

For example, the encoder 100 in the first embodiment is an electromagnetic induction type linear encoder, but the present invention is not limited to this constitution. For example, the encoder may include only a photoelectric encoder or may include both a photoelectric encoder and an electromagnetic induction type encoder. When the encoder includes a photoelectric encoder, for example, materials having different reflectance and different film formation methods can be used for the adhesive layer and the pattern layers (for example, high reflectance of Al relative to Cu, Ti, or Cr may be used or a transparent material such as ITO is used as the adhesive layer). Alternatively, as illustrated in a second embodiment of FIG. 7, removed patterns 224A in which an adhesive layer 224 is partially removed may be formed between pattern layers 226 to increase the reflectance. When the encoder includes a photoelectric encoder, it is preferable that the protective layer be formed of a transparent material. In this way, when the encoder includes a photoelectric encoder, it is possible to prevent operation failure of the encoder due to attachment of dust or particles based on static electricity while preventing discharge of static electricity. The encoder may be of a rotary type and the encoder scale may be of a disk type, or the encoder may be cylindrical and the encoder scale may be cylindrical.

In the first embodiment, the glass substrate 122 is used as the insulating substrate, but the present invention is not limited to this constitution. For example, the insulating substrate may be a board on which circuit components are mounted such as a glass epoxy substrate or a ceramics substrate, or may be a substrate using a Si substrate as a base and having only a surface subjected to an insulating process. Alternatively, a sapphire substrate or a quartz substrate may be used.

In the first embodiment, the encoder 100 is of an assembly type, a bearing is installed in the detector head 110, and the bearing comes in contact with the encoder scale 120, but the present invention is not limited to this constitution. For example, the encoder may be of a separate type in which the encoder is separated into the detector head and the encoder scale. In this case, the detector head does not include a bearing, the detector head is supported by a mobile part of a device, and the encoder scale is supported by a fixed part of the device. The detector head and the encoder scale face each other with a small clearance (for example, 100 µm or less) in a noncontact manner. The electrostatic countermeasure is considerably effective because the bearing may come in contact and there is a possibility that static electricity will be generated depending on a distance relationship between the detector head and the encoder scale, a usage environment of the encoder (high or low temperature and humidity, large or small dust or particles), or the like.

In the first embodiment, the support member 118 directly supports the encoder scale 120, but the present invention is not limited to this constitution. For example, the encoder scale may be directly attached to a fixed part of a device using an attachment member or the like (including an adhesive) or the encoder scale may be connected to a reference potential of the device, that is, be grounded.

In the first embodiment, the adhesive layer 124 and the pattern layer 126 are formed on the detector-head-side surface 122A of the glass substrate 122, but the present invention is not limited to this constitution. For example, the adhesive layer and the pattern layers may be formed on the opposite detector-head-side surface (back surface) of the glass substrate. When the glass substrate is considerably thin, the advantageous effects similar to those in the first embodiment can be obtained.

Figure 8:
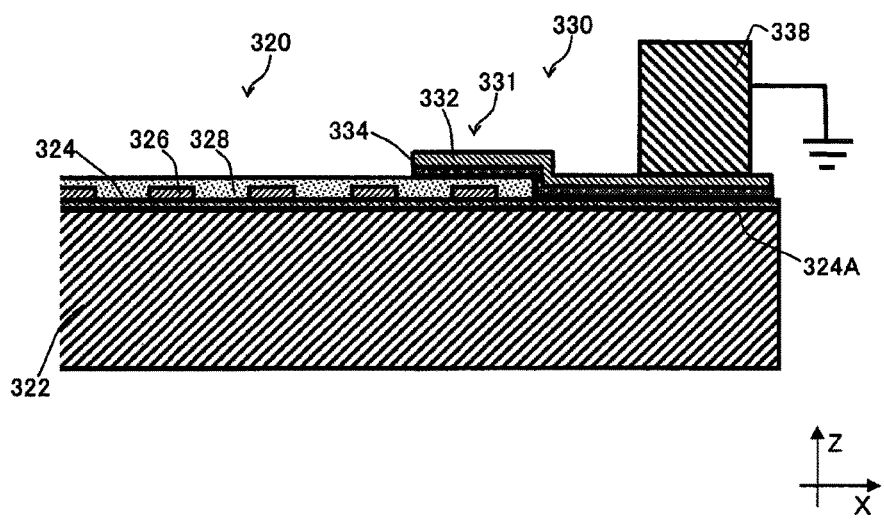
FIG. 8 is a schematic diagram illustrating an example of an encoder scale according to a third embodiment of the present invention.

In the first embodiment, the conductive member 120 includes the ground clip 136, but the present invention is not limited to this constitution. For example, a constitution illustrated in a third embodiment of FIG. 8 may be employed. In the third embodiment, a conductive elastic member 338 instead of the ground clip is disposed between a metal member such as an aluminum frame constituting the support member and the glass substrate. For example, a conductive resin, elastomer, or interconnect can be used as the elastic member 338. In this case, the elastic member 338 is disposed between a glass substrate 322 and the support member so as to press the aluminum film 332 against an out-of-detection-range pattern 324A. Accordingly, the elastic member 338 can apply a uniform pressing force to the aluminum film 332 with the surface facing the glass substrate 322. That is, in this embodiment, the same operational advantages similar to those in the first embodiment can be obtained, it is also possible to further stability electrical connection of the out-of-detection-range pattern 324A to the aluminum tape 331. The ground clip may be combined and the ground clip may clamp only the elastic member or the glass substrate and the elastic member together.

The present invention can be widely applied to insulating encoder scales that are displaced relative to a detector head.

What is claimed is:

1. An encoder scale, displaced relative to a detector head, comprising:
   an insulating substrate;
   a conductive adhesive layer that is formed on the insulating substrate; and
   conductive pattern layers that are formed on the adhesive layer in a shape enabling the detector head to detect a position, wherein:
   the adhesive layer electrically connects all the pattern layers and includes an out-of-detection-range pattern that extends outward from a position detection range of the detector head; and
   the out-of-detection-range pattern is grounded via a conductive member.

2. The encoder scale according to claim 1, further comprising
   an insulating protective layer covering the adhesive layer and all the pattern layers in the position detection range.

3. The encoder scale according to claim 2, wherein
   the conductive member covers the entire out-of-detection-range pattern on which the insulating protective layer is not formed.

4. The encoder scale according to claim 1, wherein:
   the conductive member includes a conductive thin film and a resin adhesive film including a conductive filler on the bottom surface thereof; and
   the thin film is electrically connected to the out-of-detection-range pattern by bringing the out-of-detection-range pattern into contact with the conductive filler.

5. The encoder scale according to claim 1, wherein:
   the conductive member includes a metallic holding member that is formed in a shape which is elastically deformed to hold the insulating substrate; and
   when the conductive member includes a conductive thin film, the holding member clamps the thin film and the insulating substrate together to press the thin film against the out-of-detection-range pattern.

6. The encoder scale according to claim 1, wherein:
   the conductive member includes a conductive elastic member; and
   when the conductive member includes a conductive thin film, the elastic member is disposed to press the thin film against the out-of-detection-range pattern.

7. The encoder scale according to claim 1, wherein
   the encoder scale is grounded at only one position.

8. A method of manufacturing and attaching an encoder scale that is displaced relative to a detector head, the method comprising:
   forming a conductive adhesive layer on an insulating substrate;
   forming pattern layers having a shape, in which the pattern layers are electrically connected to each other by the adhesive layer and which enables the detector head to detect a position, on the adhesive layer; and grounding an out-of-detection-range pattern of the adhesive layer extending outward from a position detection range of the detector head via a conductive member.

* * * * *